US012592771B2

(12) United States Patent
Rojas Calvente et al.

(10) Patent No.: US 12,592,771 B2
(45) Date of Patent: Mar. 31, 2026

(54) METHOD AND APPARATUS FOR AVOIDING SATURATION IN OPTICAL WIRELESS POINT-TO-POINT SYSTEMS

(71) Applicant: SIGNIFY HOLDING B.V., Eindhoven (NL)

(72) Inventors: Francisco David Rojas Calvente, Eindhoven (NL); Pamungkas Prawisuda Sumasta, Breda (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 154 days.

(21) Appl. No.: 18/283,277

(22) PCT Filed: Mar. 15, 2022

(86) PCT No.: PCT/EP2022/056685
§ 371 (c)(1),
(2) Date: Sep. 21, 2023

(87) PCT Pub. No.: WO2022/200124
PCT Pub. Date: Sep. 29, 2022

(65) Prior Publication Data
US 2024/0171272 A1 May 23, 2024

(30) Foreign Application Priority Data
Mar. 26, 2021 (EP) ..................................... 21165227

(51) Int. Cl.
*H04B 10/00* (2013.01)
*H04B 10/079* (2013.01)
(Continued)

(52) U.S. Cl.
CPC ..... *H04B 10/0793* (2013.01); *H04B 10/1143* (2013.01)

(58) Field of Classification Search
CPC ... H04B 10/11; H04B 10/112; H04B 10/1121; H04B 10/1123; H04B 10/1125;
(Continued)

(56) References Cited

U.S. PATENT DOCUMENTS

| | | | |
|---|---|---|---|
| 7,110,678 B2 | 9/2006 | Willebrand et al. | |
| 7,831,154 B2 | 11/2010 | Alwan et al. | |

(Continued)

FOREIGN PATENT DOCUMENTS

| | | |
|---|---|---|
| JP | 2011249863 A | 12/2011 |
| KR | 20110040502 A | 4/2011 |

(Continued)

OTHER PUBLICATIONS

Texas Instruments, "2.5-Gbps Transimpedance Amplifier With AGC and RSSI", Sep. 2005, www.ti.com.
(Continued)

*Primary Examiner* — Daniel G Dobson

(57) ABSTRACT

An apparatus (200) in a point-to-point optical wireless communication system, the apparatus comprises an optical receiver (210) configured to receive a signal; a power detector (202) configured to detect a signal strength of the received signal; a digital baseband module (203) configured to demodulate the received signal and measure a data rate of the received signal; and a controller (204) configured to derive a gain setting adjustment according to a change of the measured data rate when the detected signal strength is above a certain threshold.

13 Claims, 5 Drawing Sheets

(51) Int. Cl.
  *H04B 10/114*　　　(2013.01)
  *H04J 14/00*　　　(2006.01)

(58) Field of Classification Search
  CPC ............ H04B 10/1127; H04B 10/1129; H04B
  　　　　　10/114; H04B 10/1141; H04B 10/1143;
  　　　　　H04B 10/1149; H04B 10/116; H04B
  　　　　　　　　　　　10/118
  See application file for complete search history.

(56) References Cited

U.S. PATENT DOCUMENTS

| | | | |
|---|---|---|---|
| 10,236,978 B2 | 3/2019 | Ethan | |
| 2010/0183296 A1 | 7/2010 | De Langen et al. | |
| 2012/0155864 A1 | 6/2012 | Pepeljugoski et al. | |
| 2016/0248513 A1 | 8/2016 | Saito et al. | |
| 2017/0257173 A1* | 9/2017 | Harris | H04B 10/07953 |
| 2019/0081702 A1 | 3/2019 | Laycock et al. | |
| 2020/0033124 A1 | 1/2020 | Lee | |
| 2022/0271845 A1* | 8/2022 | Kirrbach | H04B 10/64 |
| 2023/0006740 A1* | 1/2023 | Jongsma | H04B 10/1123 |

FOREIGN PATENT DOCUMENTS

| | | | |
|---|---|---|---|
| WO | 2005078969 A1 | 8/2005 | |
| WO | 2013035139 A1 | 3/2013 | |

OTHER PUBLICATIONS

Bandele et al., "Saturation in cascaded optical amplifier free-space optical communication systems," IET Optoelectronics, ISSN 1751-8768, Jul. 27, 2015, Accepted on Oct. 7, 2015, DOI: 10.1049/iet-opt.2015.0083, www.ietdl.org.

Wang, Qing, "In Light and in Darkness, in Motion and in Stillness: A Reliable and Adaptive Receiver for the Internet of Lights," IEEE Journal on Selected Areas in Communications, vol. 36, No. 1, Jan. 2018, pp. 149-161.

F. Touati, S. Douss, N. Elfadil, Z. Nadir, M.B. Suwailam and M. Loulou, 2007. High-performance Optical Receivers Using Conventional Sub-micron CMOS Technology for Optical Communication Applications. Journal of Applied Sciences, 7: 559-564, DOI: 10.3923/jas.2007.559.564, URL: https://scialert.net/abstract/?doi=jas.2007.559.564, last retrieved Oct. 28, 2025.

* cited by examiner

500

METHOD AND APPARATUS FOR AVOIDING SATURATION IN OPTICAL WIRELESS POINT-TO-POINT SYSTEMS

CROSS-REFERENCE TO PRIOR APPLICATIONS

This application is the U.S. National Phase application under 35 U.S.C. § 371 of International Application No. PCT/EP2022/056685, filed on Mar. 15, 2022, which claims the benefit of European Patent Application No. 21165227.6, filed on Mar. 26, 2021. These applications are hereby incorporated by reference herein.

FIELD OF THE INVENTION

The invention relates to the field of optical wireless communication. More particularly, various methods, apparatus, systems, and computer-readable media are disclosed herein related to gain control in a point-to-point optical wireless communication system.

BACKGROUND OF THE INVENTION

In recent years, a wide range of technological advances, such as data collection, analytics, machine learning, and augmented reality, has fueled the rise of smart, automated factories. Industry 4.0 is the current trend of automation and data exchange in manufacturing technologies. It includes cyber-physical systems, the Internet of things and cloud computing. Yet connectivity has remained a critical barrier to realizing the full potential of Industry 4.0. Even the most advanced factories of today still largely depend on existing radio frequency (RF) based technologies, such as Wi-Fi. However, RF based communication technologies have certain limitations in industrial environment, where RF is either not allowed or performs poorly due to multipath resulted from metal surfaces.

The emergence of advanced connectivity technologies may provide manufacturers a reliable alternative. Optical wireless communication, or more particularly Li-Fi point-to-point communication, are emerging as a reliable high-speed alternative to RF communication in harsh industrial environments. This will enable critical communications, such as the wireless control of machines and manufacturing robots and may unlock the full potential of Industry 4.0.

SUMMARY OF THE INVENTION

The inventors recognize that for the use case of production lines and automated machinery, one practical problem to be solved is that the distance between two devices that need to be interfaced may vary constantly, following the motion of the machinery. Although the communication link itself may tolerate certain level of pathloss variation, a drastic change may lead to either deep saturation or breaking of the link.

In view of the above, the present disclosure is directed to methods, apparatus, systems, computer program and computer-readable media for an advanced automatic gain control scheme in a point-to-point optical wireless communication system, where the decision on gain control is determined not only based on the received signal strength but also correlated to a change of an actual data rate on the link. This is particularly helpful when the optimal reception performance is achieved in a saturation region of the receiver. In contrast, with the conventional gain control approach, which is purely relying on the received signal strength, only a sub-optimal reception performance can be achieved.

More particularly, the goal of this invention is achieved by an apparatus as claimed in claim 1, by a point-to-point optical wireless communication system as claimed in claims 9 and 10, by a method of an apparatus as claimed in claim 11, and by a computer program as claimed in claim 12.

In accordance with a first aspect of the invention an apparatus is provided. An apparatus in a point-to-point optical wireless communication system, the apparatus comprising: an optical receiver configured to receive a signal; a power detector configured to detect a signal strength of the received signal; a digital baseband module configured to demodulate the received signal and measure a data rate of the received signal; and a controller configured to derive a gain setting adjustment according to a change of the measured data rate when the detected signal strength is above a certain threshold.

Point-to-point optical wireless communication (OWC) usually supports high speed communication between two remote devices with a direct and unobstructed path, or a Line-of-Sight path. It is a nice replacement to wired communication in an industrial environment, which also reduces multipath effects as compared to a RF-based wireless communication. An OWC system may operate at visible light, infrared (IR), or ultraviolet (UV) spectra.

The optical receiver is configured to receive an optical signal and converted to an electrical signal, and the power detector is used to detect the signal strength. The power detector may also be called energy detector. The received signal is demodulated and decoded digitally in the digital baseband module, and in the meanwhile the digital baseband module monitors the real-time data rate of the signal. When the received signal is above a certain threshold or considered to enter a saturation region, the controller is configured to derive a gain setting adjustment based on a change of the measured data rate of the received signal. The threshold may be predefined by the user according to the application scenario or hardware properties.

Beneficially, the controller is configured to derive a gain setting adjustment for a gain reduction when the detected signal strength is above the certain threshold and the measured data rate is reduced.

As compared to a conventional gain control approach, the gain adjustment does not purely rely on the detected signal strength, but also takes the change of the data rate into account. This may be quite beneficial when the receiver can tolerate certain level of saturation, such that a maximum data rate is achieved in that region. Furthermore, in a system composed of discrete components, the linearity of individual components along different stages of the receiver chain may not be optimized on a system level. Sometimes, it may be quite complicated or even not possible to measure those parameters separately.

Thus, it is advantageous to determine such an optimal operation point by observing the change of the measured data rate. When the signal is strong, such as above a certain threshold, the achieved data rate may experience a maximum point indicative of an optimal operation point. Therefore, the controller is configured to derive a negative gain setting adjustment to condition the over-saturated received signal, which may for example result from movement of the two communicating devices towards one another.

Advantageously, the optical receiver comprises a photodiode and a transimpedance amplifier, TIA, configured to amplify an output of the photodiode, and the controller is configured to apply the gain setting adjustment to the TIA.

A photodiode is a semiconductor device that coverts light into electric current or voltage based on the operation mode of the device. Sometimes a photodiode is also called as a photo detector, a light detector, or a photo sensor. Photodiodes may vary in construction and may for example contain optical filters, built-in lenses, and may have large or small surface areas. A photodiode usually has a slower response time as its surface area increases. Depending on the construction of the device, photodiodes can be classified into different types, such as PN photodiode, Schottky photodiode, PIN photodiode, and Avalanche photodiode. Although different types of photodiodes may work in different ways, the basic operation of these diodes remains the same.

A TIA is a type of current-to-voltage converter, which is commonly used with sensors, when they have a current response that is more linear than a voltage response. Because the output electrical signal from a photodiode is typically small, it is beneficial to amplify the signal from the photodiode to a signal with a larger swing and/or amplitude for further processing. Therefore, TIAs are very often used as a first stage amplifier to condition the received signals of a photodiode.

In a preferred setup, the gain setting adjustment derived by the controller is applied to the TIA. Thus, the received signal can be conditioned to a proper range for further digital processing.

Advantageously, the power detector has a larger dynamic range than the TIA.

Dynamic range is typically expressed in decibels (dB), which is the ratio of the highest signal level a circuit, component, or system can handle to the lowest signal level it can handle. The lowest signal level is usually determined by the noise floor of the circuit, component, or system, and the required minimum signal-to-noise ratio (SNR). The highest signal level is usually determined by the linearity of the circuit, component, or system, such that the signal is not distorted or saturated.

Considering products that are commercially available, the dynamic range of a TIA is typically quite limited. When the two communication devices get too close to each other, a received signal may increase, causing the TIA at the receiver side to enter into its saturation region resulting in clipping. In contrast, as a separate component, a dedicated power detector usually can tolerate much stronger input signals as compared to the TIA. Therefore, it is beneficial to use the power detector to measure the signal strength accurately.

In another example, the controller is configured to provide the gain setting adjustment to an optical transmitter connected to the apparatus.

Instead of or in addition to applying the gain adjustment to the receiver chain, such as to the TIA, it may also be beneficial to apply the gain adjustment to a transmitter chain, such as to an optical transmitter that is locally connected to the apparatus. Thus, the local communication device is an optical transceiver supporting bi-directional optical communication, which comprises both the apparatus and the optical transmitter in a same housing. Such a gain adjustment mechanism assumes that the bi-directional optical link is symmetrical, and the two remote devices may use a same or similar output power level. In practice, this is a very common scenario, especially for point-to-point optical wireless communication. Therefore, upon a gain setting adjustment derived based on a first signal received from a remote device by the apparatus, the controller may apply the gain adjustment to the co-located transmitter for sending a second signal to the remote device.

Beneficially, the optical transmitter may comprise an optical front end, which further comprises a light source and an amplifier. The amplifier is controlled to apply different gain settings to amplify an electrical signal that drives the light source accordingly. The light source may be one of a light-emitting diode (LED), a laser diode, a vertical-cavity surface-emitting laser (VCSEL), or a hybrid front-end with both LED and VCSEL. In this option, the controller of the apparatus is configured to apply the gain setting adjustment directly to the amplifier of the optical transmitter.

In one example, a peak-to-average power ratio, PAPR of the signal is at least 3 dB.

PAPR represents a square of the ratio of the peak amplitude to the root mean square (RMS) value of the signal. PAPR characterizes the signal in terms of its waveform, which is thus sensitive to nonlinear distortion and/or amplitude-distortion. Beneficially, the signal received by the apparatus has a PAPR of 3 dB or larger, as is generally the case for certain modulation methods such as 8PSK, OQPSK, 64QAM, OFDM, etc. The region of the PAPR also gives an indication of the modulation scheme applied to the signal. High order amplitude modulation typically leads to a larger PAPR.

The disclosed scheme is extremely beneficial to signals with a large PAPR. With the conventional gain control method that is based purely on the received signal strength, the system will reduce the gain of an amplifier as long as the receiver detects a saturation of the received signal, which is usually determined by the peak power of the signal. However, in a practical system, there is still certain margin that allows the receiver to correctly demodulate and decode the signal even when the peak power may saturate certain components in the receiver chain. That operation region may contribute to a maximum throughput being achieved. In this manner performance may thus be improved Preferably, the signal is according to a spread spectrum modulation.

Multicarrier spread spectrum technique has the benefit of improved channel capacity and robustness to multi-user interference. Depending on the profile of the communication channel, adaptive bit loading, such as applying different orders of modulation on different subcarriers, the channel capacity can be further increased. Thus, it is a preferred modulation to be used in the point-to-point optical wireless communication system.

Beneficially, the signal is an orthogonal frequency-division multiplexing, OFDM, signal.

OFDM is widely used as a digital multi-carrier modulation method in many communication systems, because it has a great advantage of robustness against severe channel conditions, such as narrowband interference or frequency selective fading. By splitting the entire band into a plurality of subcarriers, the system also has the flexibility to apply different modulation and coding schemes to individual subcarriers, which may be used to maximize the capacity of the channel. For optical wireless communication, unipolar OFDM modulation techniques are typically employed, such as ACO-OFDM, DCO-OFDM, ADO-OFDM and/or Flip OFDM.

In a preferred setup, the point-to-point optical wireless communication system is an OFDM-based multi-carrier system.

In accordance with a second aspect of the invention a point-to-point optical wireless communication system is provided. A point-to-point optical wireless communication system comprising: an optical transmitting device configured to transmit a signal to a remote optical receiving device;

the remote optical receiving device comprising an apparatus according to the present invention.

In a first possible setup, the disclosed gain control scheme is applied at the remote optical receiving device. The gain setting adjustment is derived by the controller of the apparatus based on a currently receiving signal, and then the gain setting adjustment is applied directly to the TIA in the receiver chain. Thus, resulting in a real-time gain adjustment being applied to the receiving signal.

In another setup, a point-to-point optical wireless communication system comprises: a first optical transceiver device comprising a first apparatus according to the present invention and a first optical transmitter connected thereto; and a second optical transceiver device comprising a second apparatus according to the present invention and a second optical transmitter connected thereto; and wherein the first optical transceiver device is configured to transmit a first signal to the second optical transceiver device; and the second optical transceiver device configured to: receive the first signal; and apply a gain setting adjustment derived from the first signal to the second optical transmitter for transmitting another signal back to the first optical transceiver device.

In this second possible setup, the disclosed gain control scheme is applied at the second optical transceiver device for transmitting a new packet to the first optical transceiver. The gain setting adjustment is derived by the second optical transceiver device based on a first signal received from the first optical transceiver earlier on. The underlying assumption is that the first optical transceiver and the second optical transceiver has a bi-directional point-to-point link, and the bi-directional link is symmetrical. Therefore, by applying the gain setting adjustment to the second optical transmitter for transmitting another signal back to the first optical transceiver device avoids the situation that the other signal gets saturated in the first optical transceiver device. In the meanwhile, the same gain setting adjustment may also be applied to the TIA in the receiving chain of the second optical transceiver device for the reception of the first signal or any upcoming signal from the first optical transceiver device.

In accordance with a third aspect of the invention a method of an apparatus is provided. A method of an apparatus in a point-to-point optical wireless communication system, the method comprising the apparatus: receiving a signal; detecting a signal strength of the received signal; demodulating the received signal and measuring a data rate of the received signal; and deriving a gain setting adjustment according to a change of the measured data rate when the detected signal strength is above a certain threshold.

The method further comprises the apparatus deriving a gain setting adjustment for a gain reduction when the detected signal strength is above the certain threshold and the measured data rate is reduced.

The invention may further be embodied in a computer program comprising code means which, when the program is executed by an apparatus comprising processing means, cause the processing means to carry out the method of the apparatus as disclosed in the present invention.

BRIEF DESCRIPTION OF THE DRAWINGS

In the drawings, like reference characters generally refer to the same parts throughout the different figures. Also, the drawings are not necessarily to scale, emphasis instead generally being placed upon illustrating the principles of the invention.

DETAILED DESCRIPTION OF EMBODIMENTS

The embodiments set forth below represent information to enable those skilled in the art to practice the embodiments and illustrate the best mode of practicing the embodiments. Upon reading the following description in light of the accompanying drawings, those skilled in the art will understand the concepts of the disclosure and will recognize applications of these concepts not particularly addressed herein. It should be understood that these concepts and applications fall within the scope of the disclosure.

Figure 1:
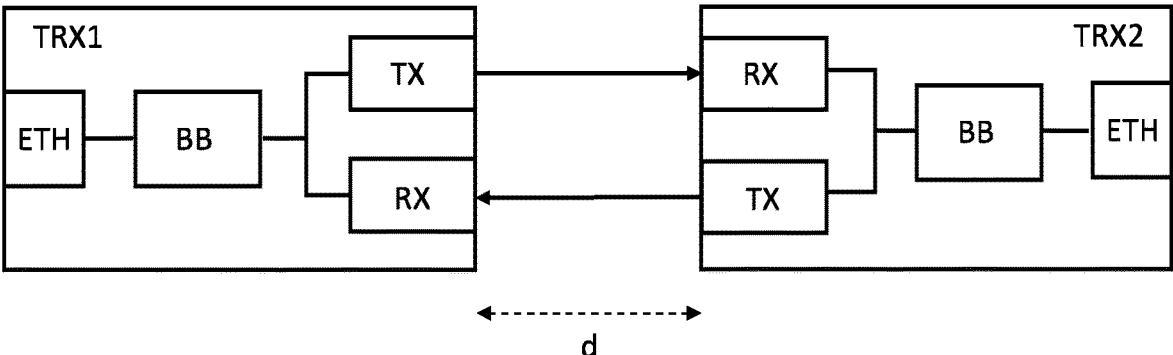
FIG. 1 illustrates a bi-directional point-to-point communication link.

The communication system is a point-to-point optical wireless communication system, operating at an optical band, such as in visible light, Ultraviolet (UV), and Infrared (IR) spectra. FIG. 1 depicts a simplified version of a Li-Fi or free-space-optical (FSO) point-to-point communication system, which is composed of two transceivers TRX1 and TRX2. Each transceiver a baseband module, BB, which may be an ITU g.hn/g.vlc or IEEE compliant baseband, an optical receiver RX, an optical transmitter TX, and a connection to an external device, such as an Ethernet connection ETH. Both transceiver units are aligned and separated by a distance of d, establishing a free space optical connection or a Li-Fi connection. One of the transceivers may be connected through the connection port, such as the Ethernet port ETH, to a machine or device, while the other transceiver may be mounted on the other part of the same machine or device or a different machine or device, which interfaces to an external network through its corresponding ethernet port ETH.

Figure 2:
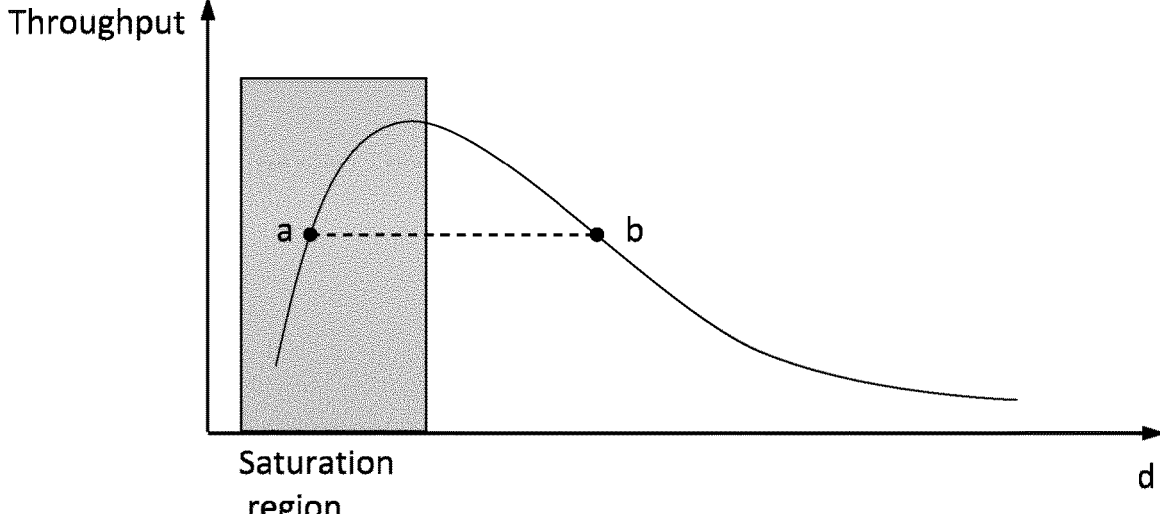
FIG. 2 illustrates the change of throughput over distance between two communication devices.

When the distance d between the two transceivers is too small, such as in the order of cm, the received signal may enter a saturation region in which the throughput reduces quickly, following a behavior as depicted in FIG. 2. It can be seen from the figure that although the throughput decreases when the distance reduces and enters the saturation region, the signal strength however does not, and maintains at a high level. Also, a specific throughput can correspond either to a distance within the saturation region or an outside the saturation region where throughput decays with distance (therefore adjustment would not be needed). In the figure, points "a" and "b" indicates an equal throughput or a same data rate, but for point "a" the gain of either the receiver or the opposite transmitter would have to be reduced to increase the throughput.

Therefore, to detect that the transceivers are at a saturation distance, there may be two approaches:

Detect the actual distance with a time-of-flight (ToF) sensor installed in one of the devices. This solution is possible but might create problems if the devices are not fully aligned, as the ToF sensor may report incorrect measurement results.

Correlating the actual throughput or data rate with the received signal strength. When the signal strength is high or above a certain threshold, but the throughput decreases, the distance between the transceivers is within the saturation zone, thus the gain needs to be reduced.

Therefore, the invention addresses the problem of receiver saturation in point-to-point Li-Fi or FSO communication systems when two devices get too close, and the received power is too high. For example, it is applicable to industry setups in which two segments of automated machinery need to be connected by a high-speed reliable connection, and the variation of the pathloss between these two devices is so large that at specific points the distance between them is too short and the data rate drops due to saturation.

On the other hand, it is also desirable to approach an optimal operation point, where the data rate is maximized, such as close to the reflection point of the curve as shown in FIG. 2. Given that the receiver may tolerate certain level of saturation of the received signal and the optimal operation point is located in the saturation zone, it is advantageous for the apparatus as disclosed in this invention to determine a gain adjustment by correlating the received signal strength with the change of the actual throughput or data rate.

Figure 3:
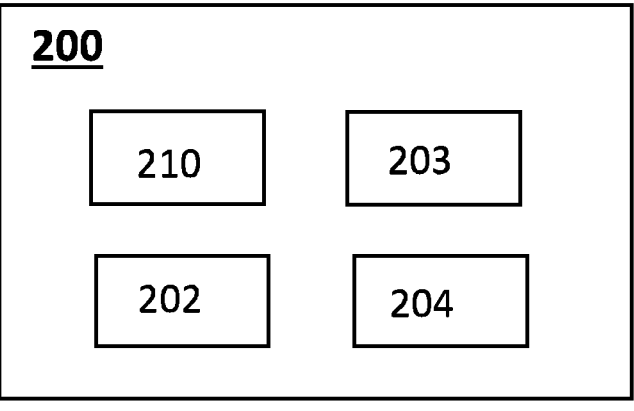
FIG. 3 schematically demonstrates the basic components of an apparatus.

FIG. 3 schematically demonstrates the basic components of an apparatus 200. The apparatus 200 comprises at least an optical receiver 210, a power detector 202, a digital baseband module 203, and a controller 204. The controller 204 may be a low power processor or controller, such as a microcontroller (MCU). The optical receiver 210 is configured to receive a signal and provides the signal to the digital baseband module 203. The digital baseband module 203 is configured to demodulate the received signal and measure a data rate of the received signal. Meanwhile, the power detector 202 is configured to detect the signal strength. With the information regarding signal strength and the measured data rate, the controller 204 is configured to derive a gain setting adjustment according to a change of the measured data rate when the detected signal strength is above a certain threshold.

Figure 4:
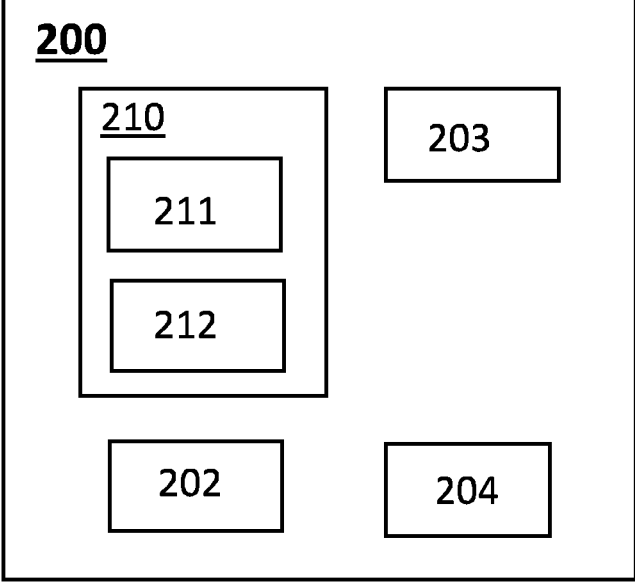
FIG. 4 schematically demonstrates an example of the basic components of an apparatus.

Another example of the basic components of the apparatus 200 is shown in FIG. 4, wherein the optical receiver 210 comprises a photodiode (PD) 211 and a transimpedance amplifier (TIA) 212. Sometimes a photodiode 211 is also called as a photo detector, a light detector, or a photo sensor. A photodiode may contain optical filters and built-in lenses. Depending on the construction of the device, photodiodes can be classified into different types, such as PN photodiode, Schottky photodiode, PIN photodiode, and Avalanche photodiode. The TIA 212 is configured to amplify an electrical output of the photodiode or photo detector 211. In this example, the controller 204 is further configured to apply the gain setting adjustment to the TIA 212. Thus, the gain of the receiver chain is adjusted accordingly.

Figure 5:
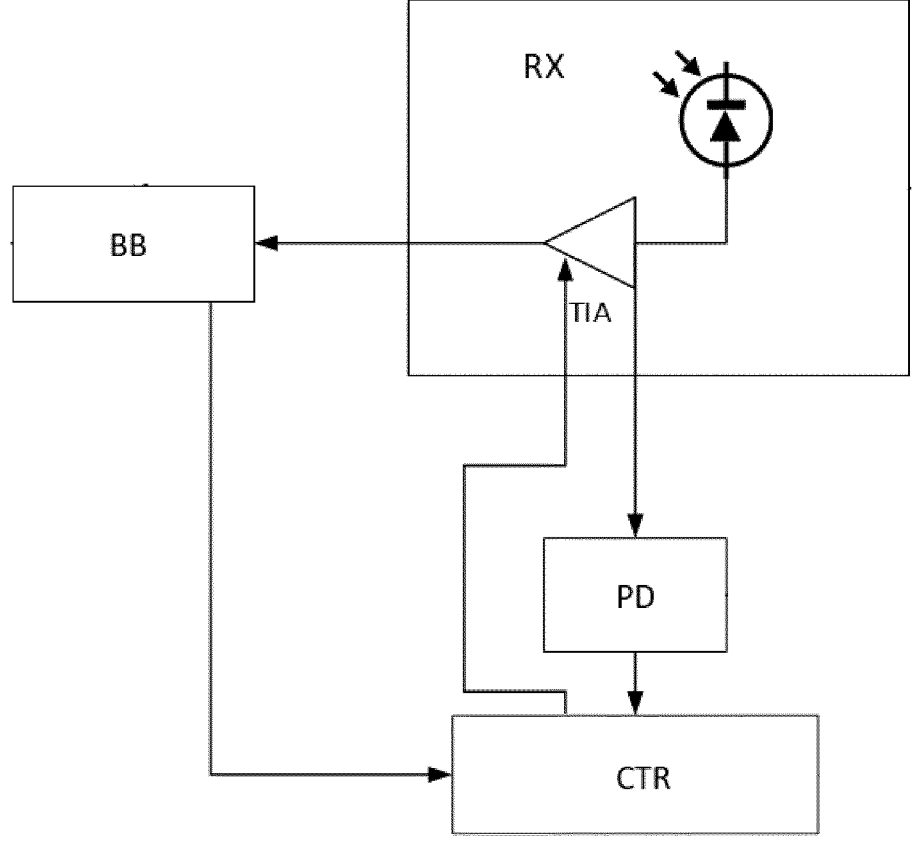
FIG. 5 illustrates an example of the control loop of the apparatus.

FIG. 5 shows a more detailed example of the control loop of the apparatus 200. The photodiode 211 receives an optical signal, which is then amplified by the following TIA 212 before it reaches the digital baseband module BB 203. The power detector 202 detects the signal strength, and the value is read by the controller 204 with an internal or external analog-to-digital converter (ADC) (not shown). The digital baseband module BB 203 measures the PHY layer data rate or throughput and sends it to the controller 204. The connection between the digital baseband module 203 and the controller may be via a wired communication protocol (e.g., UART) or a simple GPIO value coding. And then, the controller 204 decides depending on the values of the signal strength and the measured PHY data rate to determine if the system is within the saturation zone. If so, the controller 204 applies a gain setting adjustment or a correction to the gain of the TIA 212 to avoid deep saturation. As a result of that, the throughput or data rate will remain close to the maximum point of the curve as shown in FIG. 2, or close to a maximum level. Thus, the system performance is optimized. This solves a common problem of the optical receiver chain, where a TIA 212 gets saturation before the data rate reaches its highest level, considering that the photodiode 211 has a much higher dynamic range than the TIA.

Figure 6:
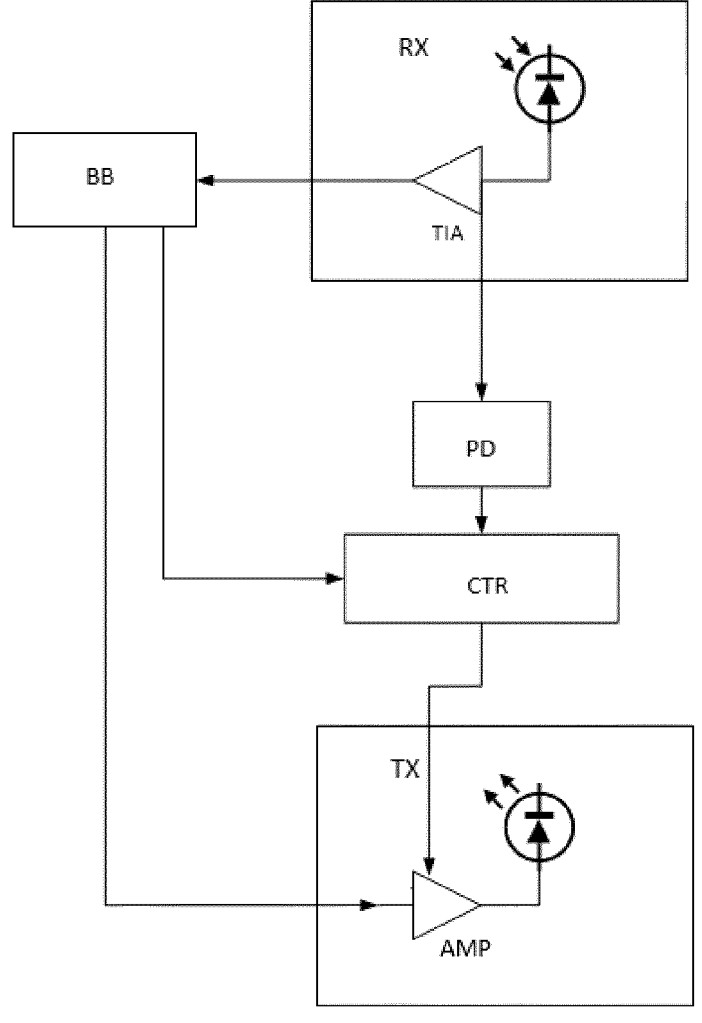
FIG. 6 illustrates another example of the control loop of the apparatus.

FIG. 6 illustrates another example of the control loop of the apparatus 200. In this example, it is assumed that the link between two remote devices is symmetrical when the light beam is aligned. Upon the detection of saturation in the received signal, instead of applying the gain adjustment to the TIA, the controller 204 is configured to apply the gain adjustment to an optical transmitter connected to the apparatus 200. Thus, it will lead to less received power at a remote device and avoiding saturation over there. The optical transmitter comprises at least an amplifier AMP and a light source. The light source may be one of a light-emitting diode (LED), a laser diode, a vertical-cavity surface-emitting laser (VCSEL), or a hybrid front-end with both LED and VCSEL. The gain setting adjustment may thus be applied to the amplifier connected to the light source of the optical transmitter.

In a further example that is not shown in the figure, the controller 204 may be configured to apply the gain setting adjustment to both the TIA in the receiver chain and the amplifier in the transmitter chain simultaneously, such that the combination of the examples shown in FIG. 5 and FIG. 6. The benefit is that the performance of the current reception is improved in the local device, as well as the reception performance of the peer device at remote.

Figure 7:
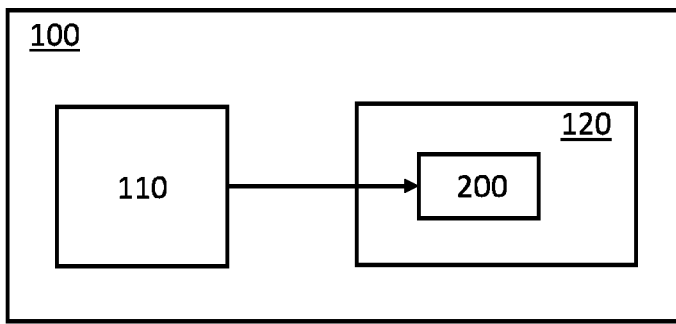
FIG. 7 demonstrates an example of the point-to-point communication system.

FIG. 7 demonstrates an example of the point-to-point communication system 100. The point-to-point optical wireless communication system 100 comprises an optical transmitting device 110 configured to transmit a signal to a remote optical receiving device 120; and the remote optical receiving device 120 comprises an apparatus 200 according to the present invention. The gain setting adjustment derived from a received signal is applied directly to the receiving chain. Although only a unidirectional link is shown in the figure, it should not be understood as a limitation. The disclosed scheme may be applied to bi-directional link as well.

Figure 8:
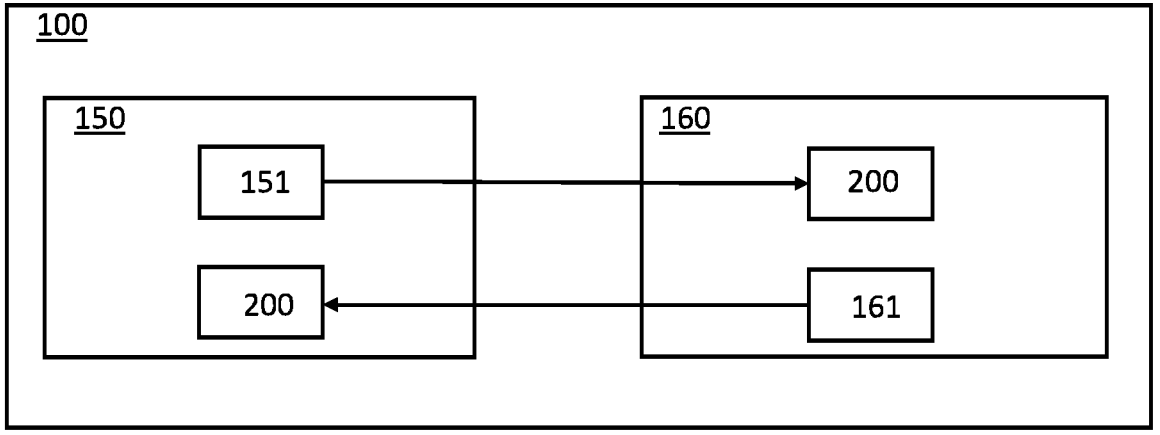
FIG. 8 demonstrates an example of the point-to-point communication system.

Another example of the point-to-point communication system 100 is demonstrated in FIG. 8. The point-to-point optical wireless communication system 100 comprises two identical communication devices, a first optical transceiver device 150 and a second optical transceiver device 160. Both devices 150, 160 comprise the apparatus 200 according to the present invention and an optical transmitter 151, 161 connected thereto. Symmetrical bi-directional link is assumed in this example. As disclosed above, in this setup, the gain setting adjustment derived by the apparatus may be applied to the receiver chain, to the transmitter chain, or to both.

Therefore, if the first optical transceiver device 150 transmits a first signal to the second optical transceiver device 160, the second optical transceiver device 160 is configured to receive the first signal; and to apply a gain setting adjustment derived from the first signal to either the second optical transmitter 161 for transmitting another signal back to the first optical transceiver device 150, or the optical receiver comprised in the second optical transceiver device 160 for further condition the received first signal, or any upcoming signal from the first optical transceiver device 150, or the combination of the previous two options by applying the gain setting adjustment to both the second optical transmitter 161 and the optical receiver comprised in the second optical transceiver device 160.

When two remote communication devices with bi-directional link carry out the same scheme as disclosed, it may be necessary to coordinate between them to avoid any instability that can be caused by both transceivers adjusting their transmitted gain (instead of TIA gain) at the same time when they react on their received signal.

Figure 9:
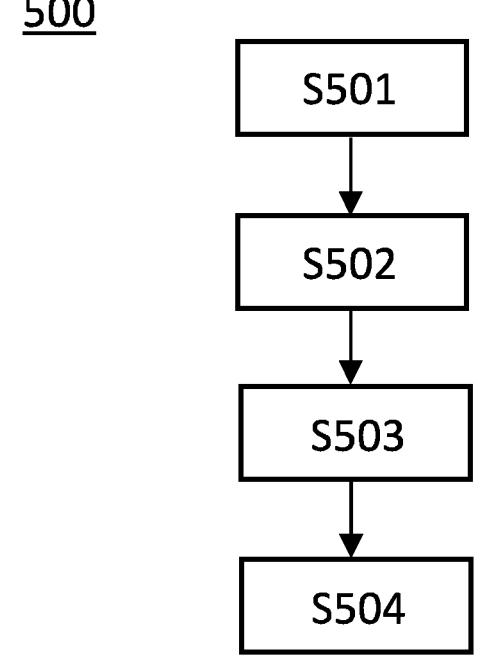
FIG. 9 shows a flow chart of a method of an apparatus.

FIG. 9 shows a flow chart of a method 500 of the apparatus 200 in a point-to-point optical wireless communication system 100. The method 500 comprises the apparatus 200: receiving a signal in step S501; detecting a signal strength of the received signal in step S502; and demodulating, in step S503 the received signal and measuring a data rate of the received signal; and then, in step S504 deriving a gain setting adjustment according to a change of the measured data rate when the detected signal strength is above a certain threshold.

The methods according to the invention may be implemented on a computer as a computer implemented method, or in dedicated hardware, or in a combination of both.

Executable code for a method according to the invention may be stored on computer/machine readable storage means. Examples of computer/machine readable storage means include non-volatile memory devices, optical storage medium/devices, solid-state media, integrated circuits, servers, etc. Preferably, the computer program product comprises non-transitory program code means stored on a computer readable medium for performing a method according to the invention when said program product is executed on a computer.

Methods, systems, and computer-readable media (transitory and non-transitory) may also be provided to implement selected aspects of the above-described embodiments.

The terms "program" or "computer program" are used herein in a generic sense to refer to any type of computer code (e.g., software or microcode) that can be employed to program one or more processors or controllers.

The invention claimed is:

1. An apparatus in a point-to-point optical wireless communication system, the apparatus comprising:
    an optical receiver configured to receive a signal;
    a power detector configured to detect a signal strength of the received signal;
    a digital baseband module configured to demodulate the received signal and measure a data rate of the received signal; and
    a controller configured to derive a gain setting adjustment according to a change of the measured data rate when the detected signal strength is above a certain threshold.

2. The apparatus of claim 1, wherein the controller is configured to derive a gain setting adjustment for a gain reduction when the detected signal strength is above the certain threshold and the measured data rate is reduced.

3. The apparatus of claim 1, wherein the optical receiver comprises a photodiode and a transimpedance amplifier, (TIA) configured to amplify an output of the photodiode, and the controller is configured to apply the gain setting adjustment to the TIA.

4. The apparatus of claim 3, wherein the power detector has a larger dynamic range than the TIA.

5. The apparatus of claim 1, wherein the controller is configured to provide the gain setting adjustment to an optical transmitter connected to the apparatus.

6. The apparatus of claim 1, wherein a peak-to-average power ratio, PAPR of the signal is at least 3 dB.

7. The apparatus of claim 1, wherein the signal is according to a spread spectrum modulation.

8. The apparatus of claim 1, wherein the signal is an orthogonal frequency-division multiplexing, (OFDM) signal.

9. A point-to-point optical wireless communication system comprising:
    an optical transmitting device configured to transmit a signal to a remote optical receiving device; and
    the remote optical receiving device comprising an apparatus of claim 1.

10. A point-to-point optical wireless communication system comprising:
    a first optical transceiver device comprising a first apparatus of the apparatus of claim 5 and a first optical transmitter connected thereto; and
    a second optical transceiver device comprising a second apparatus of the apparatus of claim 5 and a second optical transmitter connected thereto;
    and wherein the first optical transceiver device is configured to transmit a first signal to the second optical transceiver device; and the second optical transceiver device configured to:
    receive the first signal; and
    apply a gain setting adjustment derived from the first signal to the second optical transmitter for transmitting another signal back to the first optical transceiver device.

11. A method of an apparatus in a point-to-point optical wireless communication system, the method comprising the apparatus:
    receiving a signal;
    detecting a signal strength of the received signal;
    demodulating the received signal and measuring a data rate of the received signal; and
    deriving a gain setting adjustment according to a change of the measured data rate when the detected signal strength is above a certain threshold.

12. The method of claim 11, the method comprising the apparatus:
    deriving a gain setting adjustment for a gain reduction when the detected signal strength is above the certain threshold and the measured data rate is reduced.

13. A non-transitory computer readable medium comprising instructions which, when the program instructions are executed by an apparatus causes the apparatus to execute the steps of the method claim 11.

* * * * *